United States Patent [19]

Faber

[11] 4,149,821
[45] Apr. 17, 1979

[54] RADIALLY BALANCED ROTARY DRILL

[75] Inventor: Kurt H. A. E. Faber, Sandviken, Sweden

[73] Assignee: Sandvik Aktiebolag, Sandviken, Sweden

[21] Appl. No.: 852,065

[22] Filed: Nov. 16, 1977

[30] Foreign Application Priority Data

Nov. 17, 1976 [SE] Sweden .............................. 7612818

[51] Int. Cl.² .................. B23B 51/00; B23B 41/02; B23B 31/44

[52] U.S. Cl. ................................. 408/199; 408/204; 408/226; 408/703; 408/705; 76/101 A

[58] Field of Search ............... 408/59, 199, 200, 204, 408/186, 143, 188, 204, 205, 206, 223, 227, 228, 229, 230, 231, 232, 233, 238, 239, 240, 703, 704, 705, 226; 76/101 A

[56] References Cited

U.S. PATENT DOCUMENTS

| 3,014,386 | 12/1961 | Kallio | 408/229 |
| 3,354,528 | 11/1967 | Appleby | 408/232 |
| 3,540,323 | 11/1970 | Rishel | 408/186 |
| 3,591,306 | 7/1971 | Rieden | 408/59 |
| 3,767,315 | 10/1973 | Burks | 408/59 |
| 3,963,365 | 6/1976 | Shallenberger, Jr. | 408/199 |
| 3,966,349 | 6/1976 | Osman | 408/204 |

FOREIGN PATENT DOCUMENTS 751130 1/1967 Canada .................................. 408/211

Primary Examiner—Harrison L. Hinson
Attorney, Agent, or Firm—Burns, Doane, Swecker & Mathis

[57] ABSTRACT

A rotary drill comprises a shank, two axially extending chip removal recesses, and at least two radially oriented cutting inserts. One insert is peripherally located and is arranged adjacent one of the chip removal recesses. The edge of the peripheral insert extends radially so as to form the wall of the hole to be drilled. Another insert is located radially inwardly of the peripheral insert and is arranged adjacent the other chip removal recess. The inserts extend axially to generally the same extent. The inner insert is offset from a 180 degree relationship with the peripheral insert by an angle, which angle is of such magnitude that the drill is radially balanced.

15 Claims, 14 Drawing Figures $Pp_1 \| Pp_2$
$Pp_1 = Pp_2$

A+B = C+D
AB ∥ CD

A ∥ D
B ∥ C

A = D
B = C $\underline{P_{p1} /\!/ P_{p2}}$ $\underline{P_{p1} = P_{p2}}$

RADIALLY BALANCED ROTARY DRILL

BACKGROUND AND OBJECTS OF THE INVENTION

The present invention relates to a rotary drill, preferably of the type to be equipped with indexable cutting inserts. The drill is intended for forming a hole in a workpiece made of metal or the like. The inserts of the drill are radially disposed in the drill and are angled away from each other.

Rotary drills of this kind are previously known comprising two or more replaceable indexable inserts for boring, as exemplified by U.S. Shallenberger, Jr. Pat. No. 3,963,365 issued June 15, 1976. These prior drills, however, have had to be equipped with one or several wear strips since up to now it has not been thought possible to arrange the inserts such that radial forces exerted thereon could be balanced.

End mills equipped with pairs of inwardly and outwardly located inserts are exceptions, however. With such tools it is possible to have the cutting forces balanced as a result of the cutting edges being angled 180 degrees relative to one another, while such edges are directed radially outwards and perpendicularly to the feeding direction. Under these circumstances, very small radial side forces will be developed, if any. The small differences regarding cutting forces that might occur at the center of the drill compared with those at the periphery of the drill are simply compensated for by appropriate dimensioning of the length of the cutting edge of each insert.

With drills of the aforementioned type in which the cutting edge is located perpendicularly relative to the feeding direction of the drill (usually called the setting angle), appreciable disadvantages occur in conjunction with the outwardly located insert due to impaired chip removal, while the hole-generated cutting corner is subjected to unnecessary load. A disadvantage occurring with the centrally located insert is primarily an unnecessarily large zone with negative clearance angle which adversely affects the usable lifespan of the insert.

It is, therefore, an object of this invention to provide a drill with inserts so orientated relative to one another that the cutting forces acting on inserts located centrally and peripherally are essentially balanced.

It is another object of the invention to provide such a balanced drill wherein the need for wear strips is eliminated.

It is a further object of the invention to provide such a balanced drill wherein chip removal from the outwardly located insert is not impaired.

It is still another object of the present invention to provide such a balanced drill in which the cutting corner of the outermost insert is not subjected to unnecessary load.

It is yet another object of the present invention to provide such a balanced drill in which the inwardly located insert is not required to have an unduly large negative clearance angle.

It is still a further object of the present invention to provide a novel method for radially balancing a rotary drill.

BRIEF SUMMARY OF THE INVENTION

In achieving these objects a drill comprises a shank, two axially extending chip removal recesses, and at least two radially oriented cutting inserts. One insert is peripherally located and is arranged adjacent one of the chip removal recesses. The edge of the peripheral insert extends radially so as to form the wall of the hole to be drilled. Another insert is located radially inwardly of the peripheral insert and is arranged adjacent the other chip removal recess. The inserts extend axially to generally the same extent. The inner insert is offset from a 180 degree relationship with the peripheral insert by an angle, which angle is of such magnitude that the drill is radially balanced.

Thus, only driving-movement and axial feeding forces act upon the drill shank.

THE DRAWING

Preferred embodiments of the invention will now be described more in detail in conjunction with the accompanying drawings in which.

Figure 4:
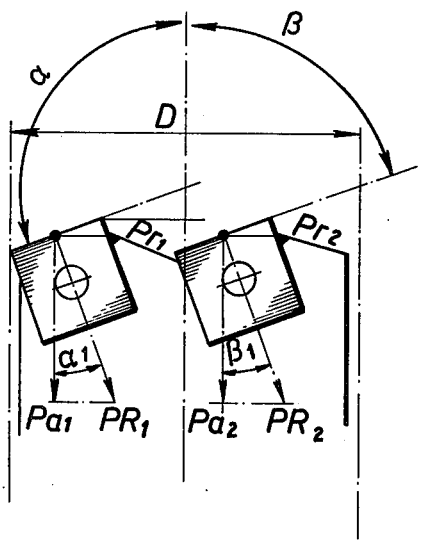
Figure 5:
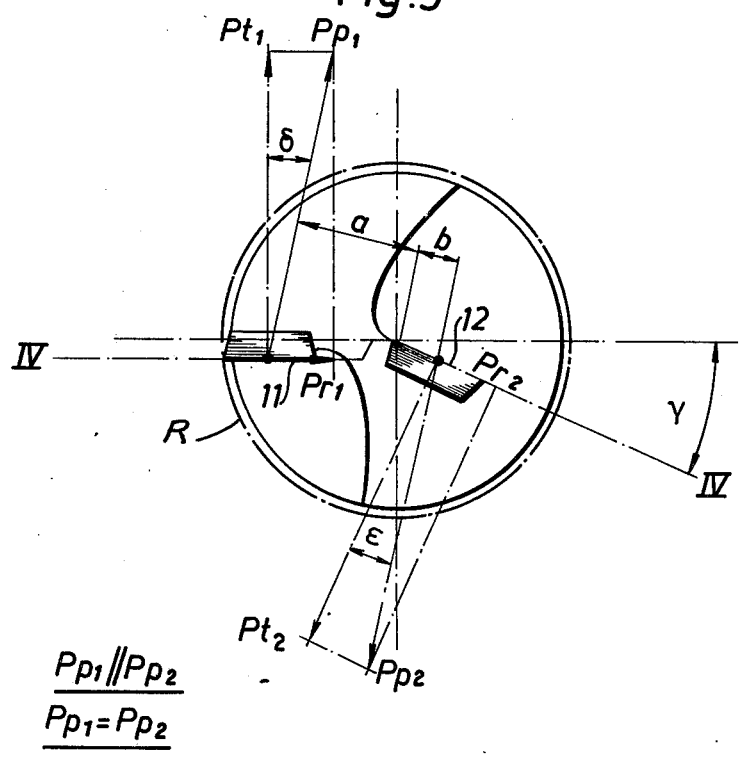
Figure 6:
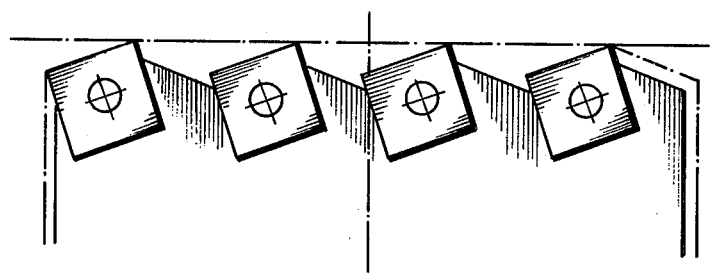
Figure 7:
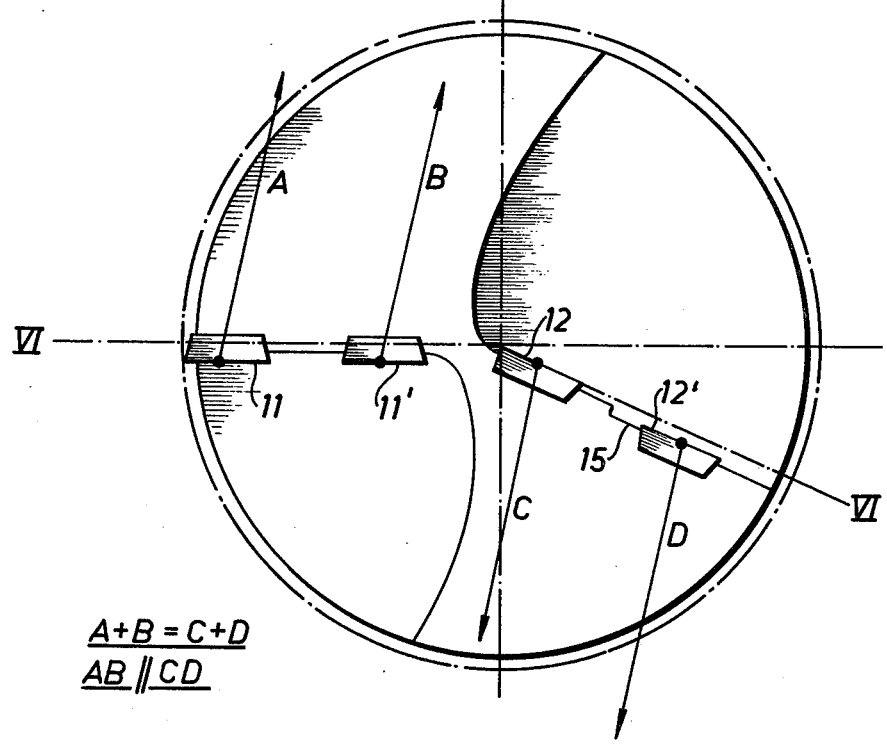
Figure 8:
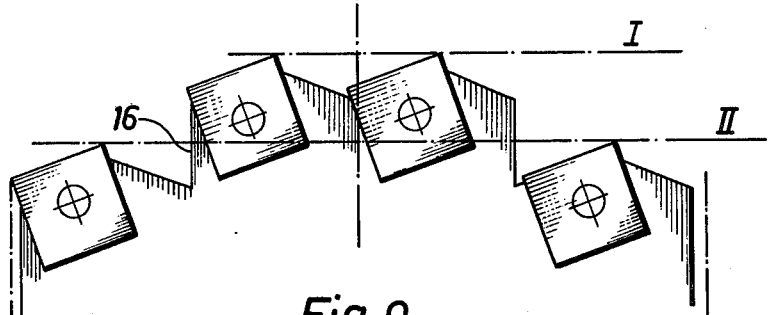
Figure 9:
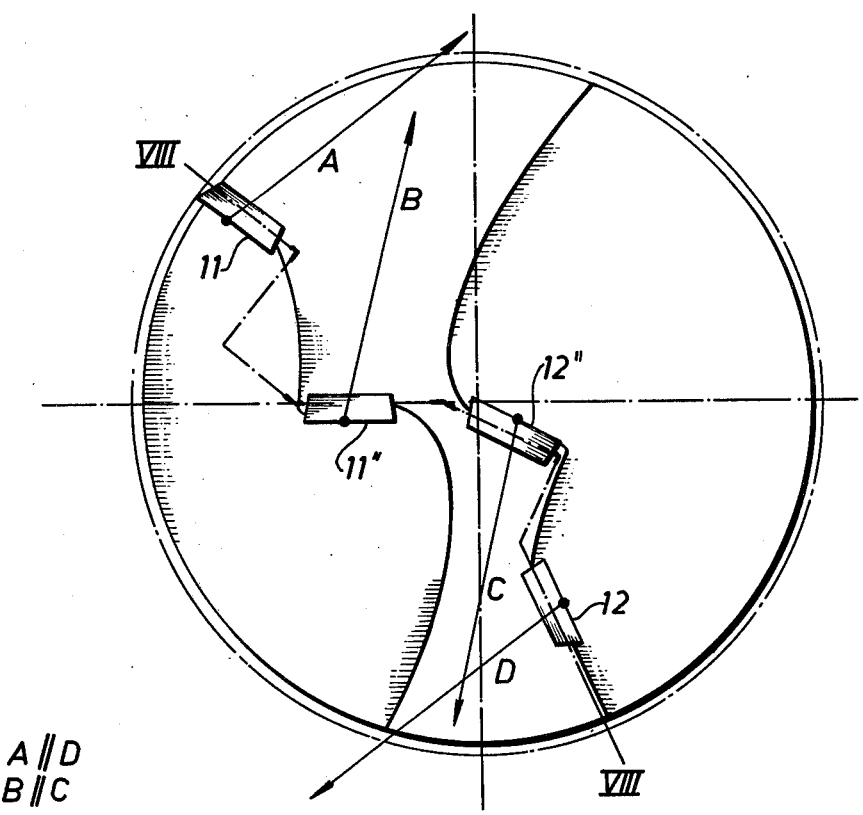
Figure 10:
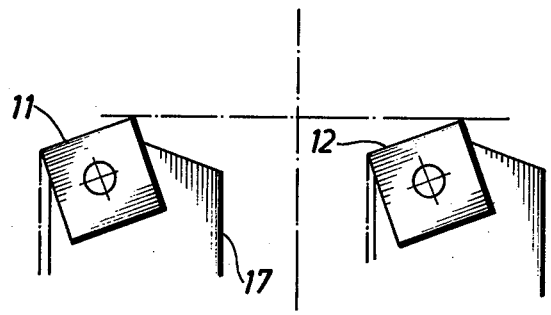
Figure 11:
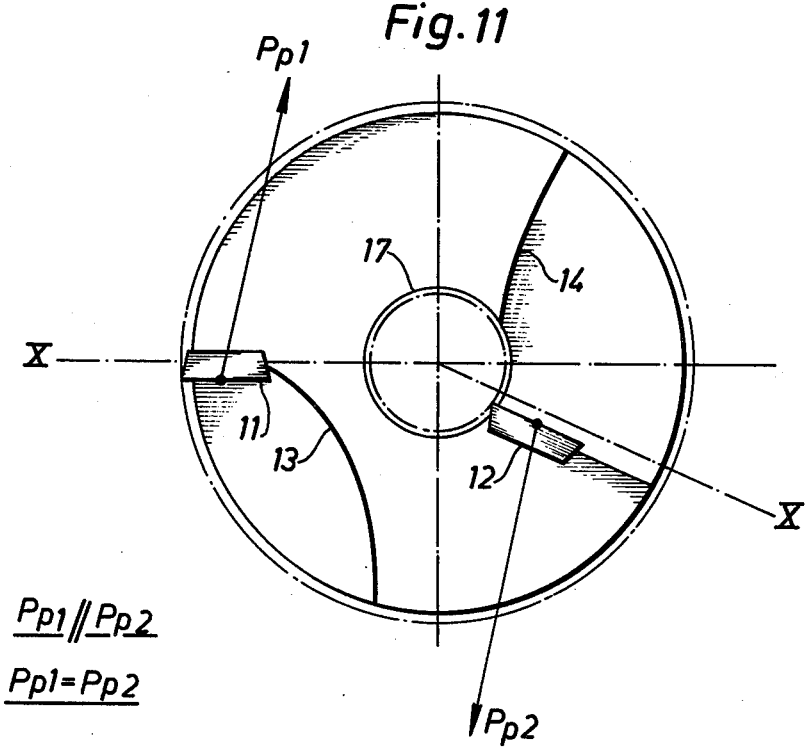
Figure 12:
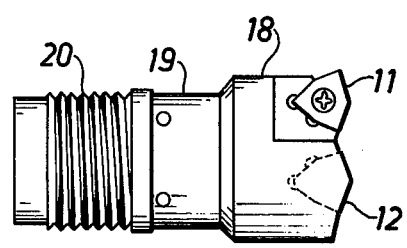
Figure 13:
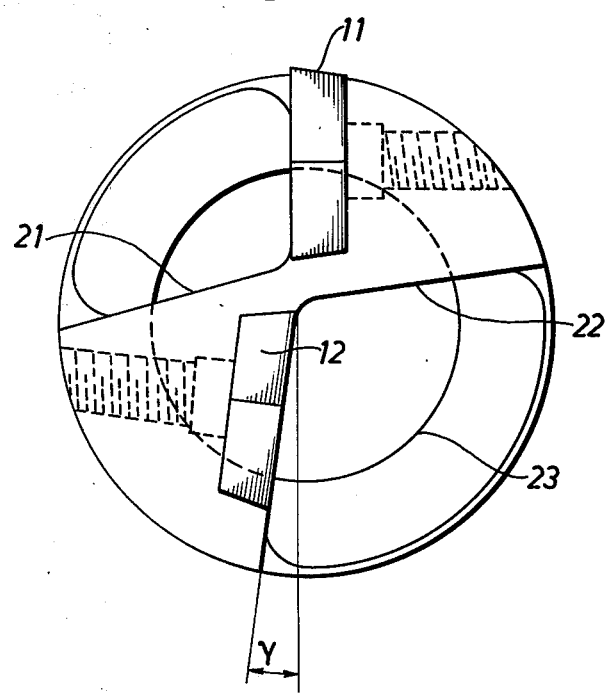

FIG. 4 is an axial view along the line IV—IV in FIG. 5 illustrating forces acting on the inserts, FIG. 5 is a front view of the drill in FIG. 4, illustrating forces acting on the inserts, FIG. 6 is an axial view along the line VI—VI in FIG. 7 of another embodiment of the invention incorporating four inserts, FIG. 7 is a front view of the drill in FIG. 6, FIG. 8 is an axial view along the line VIII—VIII in FIG. 9 of a third embodiment of the invention incorporating four inserts, FIG. 9 is a front view of the drill in FIG. 8, FIG. 10 is an axial view along the line X—X of FIG. 11 of a fourth embodiment of the invention relating to a core drill, FIG. 11 is a front view of the embodiment shown in FIG. 10, FIG. 12 is a side view of a fifth embodiment of the invention, and FIG. 13 is a front view of the embodiment shown in FIG. 12.

Figure 14:
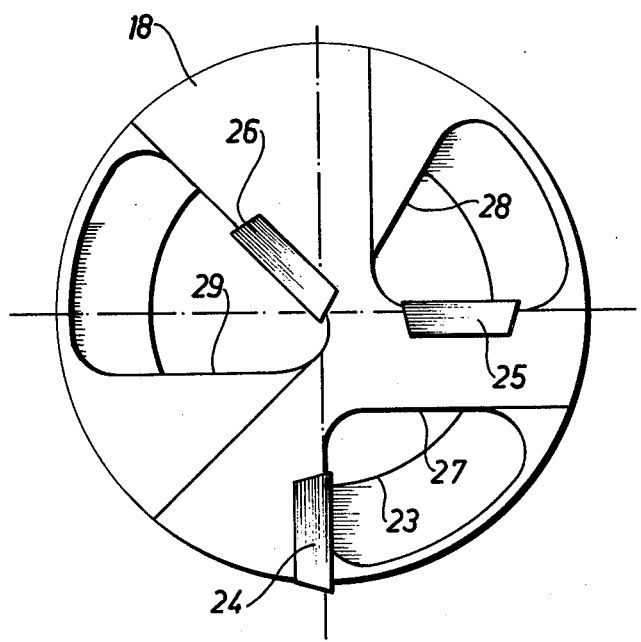

FIG. 14 is a front view of a sixth embodiment of the invention incorporating three inserts,

DETAILED DESCRIPTION OF THE PREFERRED EMBODIMENTS OF THE INVENTION

Figure 1:
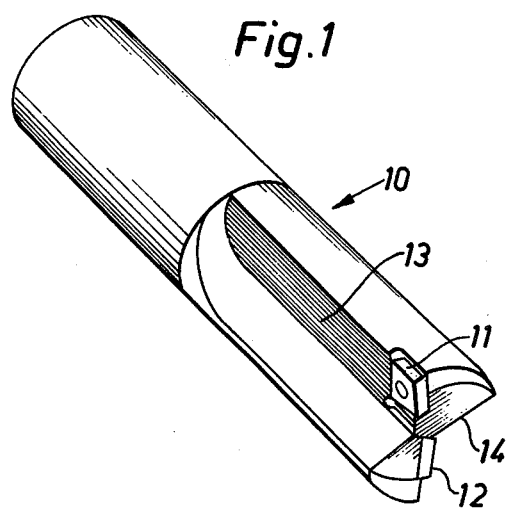
FIG. 1 is a prespective view of a drill according to the present invention.
Figure 2:
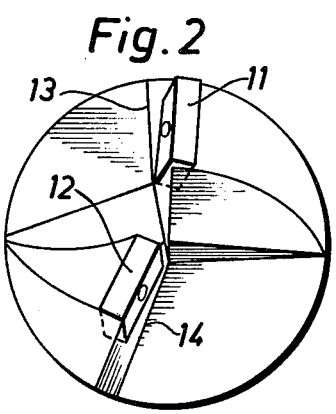
FIG. 2 is a front view of the drill in FIG. 1.
Figure 3:
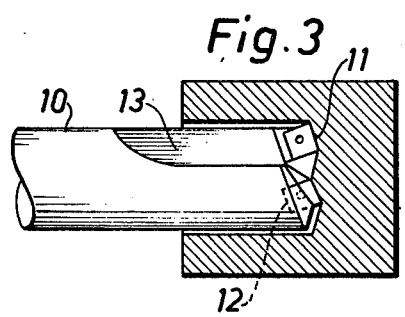
FIG. 3 is a side view of the drill forming a hole in a workpiece.

Referring now to FIG. 1, there is shown a drill 10 for forming a cylindrical hole in a workpiece. The drill comprises a shank 10 which at its foremost end is equipped with two adjustable or indexable carbide inserts 11 and 12 located on opposite sides of a center line of the drill. Axially extending recesses 13 and 14 are provided for chip removal from inserts 11 and 12 respectively. Both inserts 11 and 12 are centrally apertured and are secured to the drill shank by central locking screws (not shown) which are received in the apertures and threadably received in the shank. Each insert 11 and 12 comprises opposed flat surfaces located at right angles to the narrower edge surfaces. Both of these inserts are, as best seen in FIG. 2, located in the drill shank 10 such that they are inclined by the same negative chipping angle, as seen in the rotary direction, and together generate the entire diameter of the hole. It is to be understood, however, that the drill alternatively could be equipped with positive inserts, i.e., inserts provided with a clearance angle between a flat top surface and adjacent edge surfaces of the insert which means that the necessary cutting rake is inherently provided on the insert per se, rather than by a particular orientation of the insert relative to the shank.

The drill embodiment of FIGS. 1-5 is equipped with two inserts, one of which is a peripherally or outwardly located insert 11, the outer edge of which extends laterally such that the wall of the hole is created thereby. The other insert 12 is located inwardly of the peripheral insert, i.e., is disposed radially inwardly of the cutting circle of revolution R of the peripheral insert (FIG. 5). The other insert 12 is disposed at an angle relative to the peripheral insert 11. The inner insert 12 may be referred to as a central insert.

Referring now to FIGS. 4 and 5, the cutting forces acting upon the inserts 11 and 12 are illustrated in more detail. The cutting forces acting on the peripheral insert 11 are referenced by a sub-numeral 1, while the forces acting on the central insert 12 are referenced by a sub-numeral 2. The tangential forces are referenced by a sub-letter t, and the radial forces are referenced by a sub-letter r. The axial forces are referenced by a sub-letter a. Referring especially to FIG. 4, the resultant cutting forces which act in and define a plan parallel with the feeding direction are referenced by the letters PR, whereas the resultant forces depicted in FIG. 5 which act in and define a plane perpendicular to the feeding direction are referenced by the letters Pp.

It will be understood by those skilled in the art that when the resultant cutting forces $Pp_1$ and $Pp_2$, formed by the force vectors $Pr_1$, $Pt_1$ and $Pr_2$, $Pt_2$, respectively, are equal and orientated in opposite and parallel directions the drill shank is considered to be radially balanced in that it is not subjected to any unbalanced radial forces. That is, since the resultant forces are equal, parallel and opposite, they can be resolved into equal and opposite radial vectors on any given diameter of the drill, e.g., a diameter on the line L of FIG. 5. The drill shank is merely subjected to a turning moment calculated as $(Pp_1 \cdot a + Pp_2 \cdot b)$ where a and b represent the moment arms of the inserts, and a feeding force calculated as $(Pa_1 + Pa_2)$.

Thus, the inner insert is angled away from the peripheral insert by $180° + \gamma$ when considered in one circumferential direction and by $180° - \gamma$ when considered in the opposite circumferential direction. In other words, the inner insert is offset from a 180 degree relationship with the peripheral insert by the angle $\gamma$ which is of such magnitude that the drill is radially balanced.

Under these circumstances the drill is held almost perfectly in the center of the hole. Thus, wear strips, for the purpose of centering the drill in the hole are not needed.

Of course, it is not new to offset the inner insert from a 180 degree relationship with the peripheral insert, as demonstrated by the aforementioned U.S. Shallenberger Pat. No. 3,963,365. However, up to now there has been no realization that by virtue of an appropriate amount of such an offset, the drill can be radially balanced. Note, for example, that the Shallenberger patent expressly provides for the use of wear strips to counter the expected presence of unbalanced radial forces.

In FIG. 5 is illustrated the situation when the resultant cutting forces $Pp_1$ and $Pp_2$ are equal and orientated in opposite and parallel directions, thus ensuring force balance. This is achieved by having the centrally located insert 12 angled away from the peripheral insert 11. This can be said to be the result of turning the insert 12 by an angle $180° + \gamma$ with relation to the peripheral insert 11, as seen in the rotary direction of the drill. The relations that apply regarding angle $\gamma$ are $\gamma = f(\delta + \epsilon)$ where $\delta$ represents the angle appearing between forces $Pt_1$ and $Pp_1$, and whereas $\epsilon$ represents the angle appearing between forces $Pt_2$ and $Pp_2$. Thus, $\gamma$ is a function of the angles $\delta$ and $\epsilon$. Further relations that apply here are as follows:

$$\tan\delta = \frac{Pr_1}{Pt_1} \text{ and } \tan\epsilon = \frac{Pr_2}{Pt_2}$$

Since the values of $Pr_1$, $Pt_1$, $Pr_2$ and $Pt_2$ for a given drilling operation can be readily calculated by those skilled in the art, the exact value of the angle $\gamma$ can be determined for each operation.

Additionally, it should be observed that if the inserts comprise straight edges and small corner radii, which do not involve radial forces other than due to the setting angle, knowledge of the relationships of:

$$\frac{Pa_1}{Pt_1} \text{ and } \frac{Pa_2}{Pt_2}$$

is sufficient for the purpose of determining the value of. The angle $\gamma$ can be of any value up to 90 degrees.

It is preferable that the central insert 12 of the embodiment shown in FIGS. 1-5 be provided with an inclined bevel face at the active cutting corner which improves the strength of this cutting corner.

With the embodiment shown in FIGS. 1-5 the drill comprises a peripheral insert 11 with a setting angle $\alpha$ exceeding 90 degrees and a central insert 12 with a setting angle $\beta$ less than 90 degrees. The latter extends up to, and preferably a slight distance beyond, the center of the drill, Thus, the improved insert orientation characteristic of this invention also enables radial forces to be balanced even when the setting angle of the peripheral insert is less than 90 degrees and the setting angle of the central insert exceeds 90 degrees.

EXAMPLE

As an example of one application of a drill according to the present invention and the appropriate value of the angle $\gamma$, is a drill equipped with two inserts of basically triangular design. Each cutting edge of the inserts comprises two straight portions angled away from each other, so-called trigonal inserts, and is dimensioned so that the drill creates a bore hole in the range 42-56 mm in diameter. In such an arrangement the angle $\gamma$ is in the range 4°-10°.

It is also possible, for instance, to provide three inserts, one of which being a peripheral insert, the other two being located inside the periphery while extending in different radial directions. It is also possible to use inserts with arched cutting edges, of rounded shape for instance, or inserts having cutting edges of angular broken shape, for instance trigonal shape, as related in the example.

Referring now to FIGS. 6-7, there is shown a second embodiment incorporating four inserts which extend axially to substantially the same extent. Two of these inserts, 11 and 11', are located in the same longitudinal plane and are disposed adjacent a common chip removal recess. The two other inserts, 12 and 12', are located in separate and parallel planes while located adjacent the other chip removal recess of the drill. The radially outermost insert 12' is disposed in a tangentially depressed surface 15. When the resultant cutting forces on the inserts, indicated as A, B, C, and D, are equal in pairs and have opposite and parallel directions, balance has been achieved. The proper positioning of the inserts can be calculated in the manner discussed earlier.

In FIGS. 8–9 there is shown a third embodiment incorporating four cutting inserts, the two innermost of which being indicated 11" and 12" and located on an axially extending portion 16 of the drill shank. Both inserts extend axially to substantially the same extent. The other two, outermost inserts 11 and 12 extend axially to the same extend and are spaced further from the center of the drill than the innermost inserts. Force balance is achieved when the resultant cutting forces A and D acting on the inserts 11 and 12 are of equal value while having opposite and parallel directions, while the resultant forces B and C acting on inserts 11" and 12" similarly are equal and of opposite directions.

Thus, it will be realized that the insert 12 is offset from a 180 degree relationship with the insert 11 by an angle whose magnitude assures that the radial forces associated with inserts 11 and 12 are balanced. A similar relationship occurs between the inserts 11", 12".

In FIGS. 10–11 the concept of the invention is applied to a core drill at which the innermost insert 12 extends radially a distance into the central hole 17 of the drill.

In FIGS. 12–13 the concept of the invention is applied to a boring head 18 having a rear tubular shaft portion 19 provided with an external thread 20 to be threaded onto a drill tube (not shown). Two inserts 11 and 12 of so-called trigonal shape, i.e., basically triangular inserts, each cutting edge of which comprises two straight portions angled away from each other, are provided on the drill head according to the invention. Coolant medium is to be pumped under high pressure along the outside of the drill head. All chips produced in the hole are to be removed rearwardly by the coolant medium through chip removal recesses 21 and 22 of the drill head which each extend axially to a limited extent and then open into the cylindrical opening 23 of the shaft portion 19 of the drill head and further into the drill tube coupled thereto. As appears from FIG. 13 the innermost insert 12 is angled away from peripheral insert 11 at an angle $\gamma$, the amount of which being such that the radial forces are balanced in the manner prescribed according to the invention.

In FIG. 14 th concept of the invention is applied to a boring head of the same kind as shown in FIGS. 12–13, i.e. a boring head is with a rear tubular shaft portion. Three inserts 24, 25 and 26 of for instance trigonal shape are provided on the boring head. All chips produced are to be removed rearwardly by coolant medium through chip removal recesses 27, 28 and 29, which exstand axially to a limited content and then open in to the cylindrical opening 23 of the rear shaft portion of the boring head.

In accordance with the present invention, a drill is provided which is radially balanced in a novel and convenient manner, eliminating the need for wear strips and avoiding other problems heretofore encountered in the art, such as impairment of chip removal and overstressing of an insert cutting corner.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A drill for cutting holes comprising:
   a shank,
   two axially extending chip removal recesses, and at least two radially oriented cutting inserts,
   one insert being peripherally located and arranged adjacent one of said chip removal recesses, the edge of said one insert extending radially such as to form the wall of the hole, and
   another of said inserts being located radially inwardly of the cutting circle of revolution of said one insert and arranged adjacent the other chip removal recess,
   said inserts extending axially to generally the same extent,
   said other insert being offset from a 180 degree relationship with said one insert by an angle $\gamma$, wherein $\gamma$ is of such magnitude that the drill is radially balanced.

2. A drill as defined in claim 1, wherein said other insert extends inwardly at least as far as the center of the drill.

3. A drill as defined in claim 2, wherein said other drill extends inwardly beyond the center of the drill.

4. A drill as defined in claim 1, wherein the angle $\gamma$ has a value up to 90 degrees.

5. A drill as defined in claim 1, that the inserts are inclined in opposite directions by the same cutting rake, as seen in the direction of drill rotation.

6. A drill as defined in claim 1, wherein there are four inserts extending to generally the same axial extent, two of said inserts located in the same plane for imparting chip flow through one of the chip removal recesses, and the other two inserts located in separate and parallel planes for imparting chip flow through the other of said chip removal recesses.

7. A drill as defined in claim 6, wherein the outermost insert of said two located in the same plane constitutes a peripheral insert, and the outermost of said two inserts located in separate and parallel planes is provided in a tangentially depressed surface.

8. A drill as defined in claim 1, wherein there are four inserts, two of which being provided at an inner portion that protrudes axially from the drill shank and extending axially to generally the same extent, whereas the two other inserts extend axially to the same extent, but which is short of the axial extent of the first-mentioned two inserts.

9. A drill as defined in claim 1, wherein the inserts are polygonally shaped and the cutting corner of said other insert being provided with an inclined bevel surface.

10. A drill as defined in claim 1, wherein there are three inserts, one of which being peripherally located, the other being located inside the periphery while extending in different radial directions.

11. A drill as defined in claim 1, wherein said inserts are indexable.

12. A drill as defined in claim 1, wherein each insert is triagonal and mounted on a drill head having a rear tubular shaft portion, said chip removal recesses extending axially into and communicating with an opening of said tubular shaft portion.

13. A drill as defined in claim 10, wherein the inserts are centrally apertured and secured to the drill shank by locking screws received in said apertures while threadably received in said drill shank.

14. A drill as defined in claim 1, wherein said inserts comprise a pair of inserts positioned to cut a hole having a diameter in the range of 42–56 mm, the angle $\gamma$ being in the range of 4° to 10°.

15. A method of radially balancing a hole-cutting drill comprising:

providing a drill including a shank, two axially extending chip removal recesses, and at least two radially oriented cutting inserts, one insert being peripherally located and arranged adjacent one of said chip removal recesses, the edge of said one insert extending radially so as to form the wall of the hole, another of said inserts being located radially inwardly of the cutting circle of revolution of said one insert and arranged adjacent the other chip removal recess, said inserts extending axially to generally the same extent, and orienting said inserts such that said other insert is offset from a 180 degree relationship with said one insert by an angle $\gamma$, wherein $\gamma$ is of such magnitude that the resultants of the tangential and radial forces acting on the inserts are equal, opposite, and parallel, so that the drill is radially balanced.

* * * * *